(No Model.)
L. B. ELLIS.
STEAM ENGINE.
No. 320,233. Patented June 16, 1885.
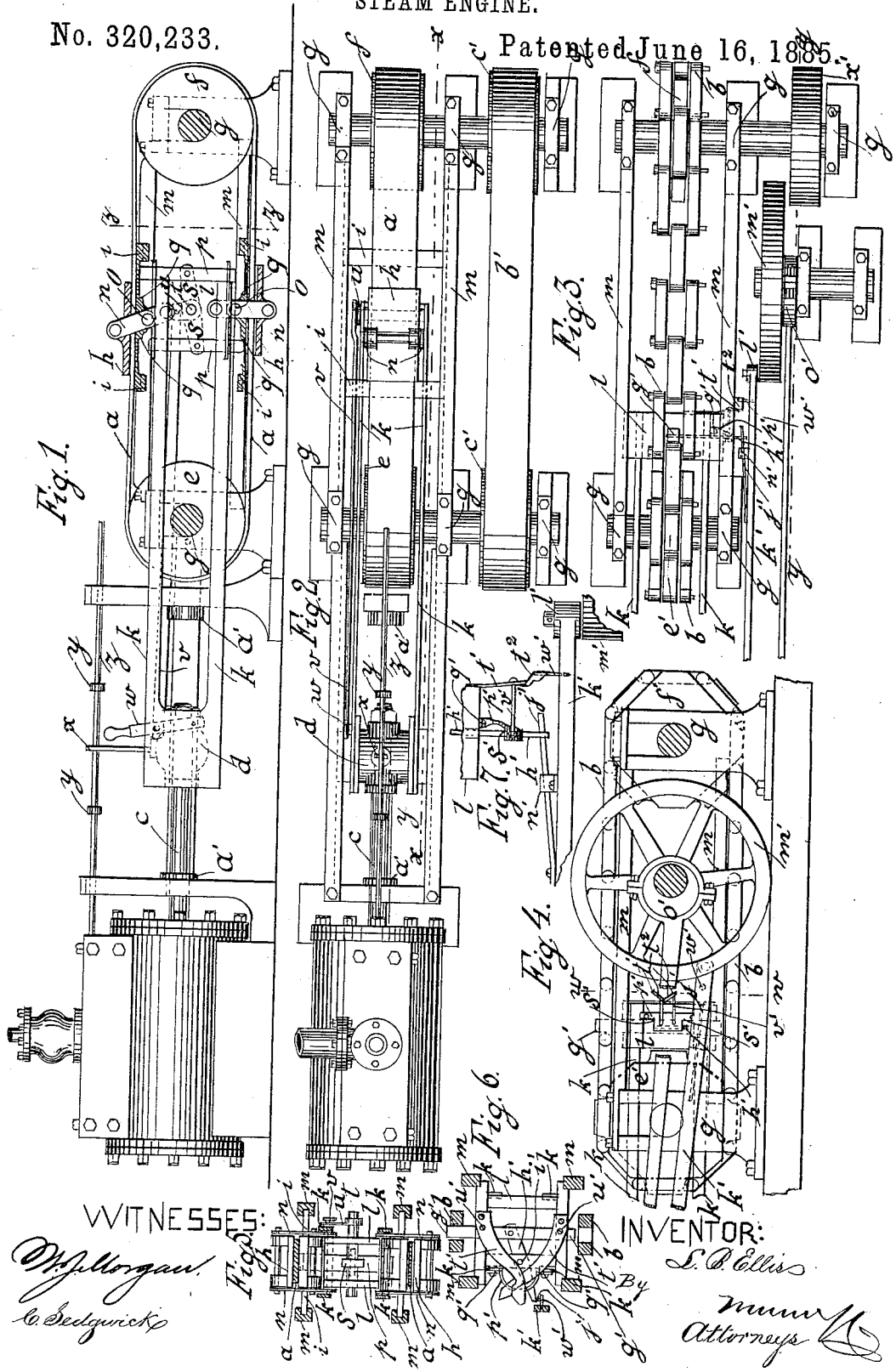

UNITED STATES PATENT OFFICE.

LARKIN B. ELLIS, OF VERNON, MICHIGAN.

STEAM-ENGINE.

SPECIFICATION forming part of Letters Patent No. 320,233, dated June 16, 1885.

Application filed October 24, 1884. (No model.)

*To all whom it may concern:*

Be it known that I, LARKIN B. ELLIS, of Vernon, in the county of Shiawassee and State of Michigan, have invented certain new and useful Improvements in Steam-Engines, of which the following is a full, clear, and exact description.

My invention consists of clamps or pawls and an endless belt or chain contrived with the connecting-rod of a steam-engine, or it may be any other reciprocating driver, to be used in lieu of the crank for transmitting the motion, the clamps being contrived to take hold of and let go the upper and lower ranges of the endless belt or chain accordingly as the motion of the cross-head reverses, and so as to drive the belt or chain continuously in one direction. The object is to apply the power with uniform leverage from beginning to the end of the strokes, and thus avoid the varying leverage of the crank-gear, all as hereinafter fully described.

Reference is to be had to the accompanying drawings, forming part of this specification, in which similar letters of reference indicate corresponding parts in all the figures.

Figure 1 is a longitudinal sectional elevation of the transmitting-gear of a steam-engine contrived with clamps and a belt, the section being taken on the line $x\ x$ of Fig. 2. Fig. 2 is a plan view of the engine as represented in Fig. 1. Fig. 3 is a plan view of the improved transmitting-gear arranged with a chain. Fig. 4 is a sectional elevation of the chain contrivance of Fig. 3 on line $y\ y$. Fig. 5 is a transverse section of Fig. 1 on line $z\ z$. Fig. 6 is a transverse section of Fig. 4 on line $w\ w$. Fig. 7 is a detail in plan view.

I arrange an endless belt, $a$, or chain $b$ in the line of the piston-rod $c$, and directly at the end of the range of the cross-head $d$ on pulleys $e$ and $f$ or sprocket-wheels $e'$ and $f'$, which are journaled in suitable bearings at $g$, and provide clamps $h\ i$ for the belt or a pawl, $g'$, for the chain, with means for shifting the clamps or pawl to engage the upper or lower range of the belt or chain, according as the piston reverses, as follows:

From the cross-head $d$, I extend a connecting-rod consisting of four bars, $k$, along past pulley $e$ or sprocket-wheel $e'$, two of said bars on each side of said pulley or wheel, and two respectively above and below the journals $g$ to a sliding block or frame, $l$, fitted to slide forward and backward between the pulleys or wheels in suitable guides, $m$, to carry the clamps or pawl.

The clamps for driving the belt consist of the plate $i$ inside of the belt, and plate $h$ outside, both pivoted to links $n$, which are pivoted at $o$ to the sliding block or frame $l$, so that they grip the belt tightly by the angular deflection of the links $n$ with relation to the belt, as represented at the upper side of Fig. 1, and they release the belt to allow it to run freely between them when maintained perpendicular to it, as seen at the lower side of the belt in said figure. The angular deflection of the links is caused by the thrust of the starting of the slide $l$, and also in some measure by the friction of the clamps on the belt. The clamps are held in the slack condition for running back on the belt by the stops $p$ holding the inner clamp-plates by the shoulders $q$, so as to prevent the links $n$ from swinging back of the perpendicular position.

As represented in Fig. 1, the slide is supposed to be moving toward the right hand, the upper clamp being gripped on the belt and the lower clamp being slack, in which position said lower clamp is held by the lower end of the left-hand stop bearing against the left-hand shoulder $q$ of said lower clamp. At the end of the stroke, when the slide reverses, the upper clamp will swing up by its momentum and by the pull of the belt to the vertical position, where it will be arrested by the right-hand shoulder $q$ of clamp-plate $i$ against the upper end of right-hand stop $p$. At the same time the lower clamp will swing back to the right by the thrust of the starting of the slide on the reverse movement into the angular position for gripping the belt and pulling back on it to the other end of the stroke. The stops $p$ are pivoted to the arms $s$ of a rock-lever, $t$, by which they may be reversed with relation to the clamps, which allows them to act reversely, and thus reverse the motion of the driving-belt without reversing the steam on the piston. The rock-shaft has a crank, $u$, from which a connecting-rod, V, extends back to a reversing-lever, w, on the cross-head d, by which the stops may be quickly reversed when the piston is reversing at either end of the stroke, without stopping the engine or other driver. Any approved form of valve-motion may be used with this contrivance, with or without a crank to control the strokes of the piston. In this case I have represented an arm, x, on the cross-head d, playing between stops y of the valve-rod z, with rubber spring-buffers a', to cushion the cross-head at the ends of the stroke.

For greater security against the slipping of the belt on the pulleys, I propose to arrange an additional belt, b', on other pulleys, c', carried on extensions of the shafts of the pulleys e and f, which also enables the belt a and its pulleys to be made narrower than would otherwise be required, which is desirable in order not to make the slideway wider than about the width of that required for the cross-head d, which is more symmetrical.

With the chain contrivance, which is substantially the same as the belt so far as the general plan is concerned, but which is not susceptible of being operated with clamps, but is adapted for the use of a pawl for engaging the links, I arrange the pawl g' in the slide l, with contrivances to shift it from one range of the chain to the other at each end of the stroke, as follows: I arrange said pawl to slide up and down freely through the center of the slide l, and connect it at the middle with a short lever, h'; pivoted in said slide at i', and projecting outward through one side of the same, so that a striking-bar, j', carried on a vibrating connecting-rod, k', attached to cross-head d, and working on the crank-pin l' of a wheel, m', will strike the end of said lever at each end of the strokes, and shift it up and down, according as the rod k' rises or falls. The striking-rod j' is a spring, which will press back to the side of rod k' after having shifted said lever to escape past the end of said lever, said spring being supported near the point where it strikes the lever by a slotted stud, n', attached to the side of connecting-rod k' for the purpose. It will be seen that the connecting-rod k' swinging downward at one end of the stroke shifts the pawl up out of the lower range of the chain into the upper range of the same, and said rod swinging up at the other end of said range shifts the pawl from the upper range of the chain down into the lower one again, and thus effects the requisite changes for reversing the connection of the piston with the chain according as the motion of the piston reverses.

For reversing the motion of the drive-chain, the steam will have to be reversed on the engine by the valve-gear, which in this case consists of the eccentric o' and slide-valves. I use a stop-latch to hold the lever h' in the different positions to which it is shifted, which consists of a bow-spring, p', attached to the slide l at q', and having shoulders s' for the lever to rest on, to prevent the pawl from shifting while the piston is making its stroke; and for releasing the lever from said shoulders preparatory to shifting it I connect said stop-latch, by links v', with a couple of spring-arms, t', attached to the slide at u', which arms have the free ends projecting beyond where the links v' are connected to them, and arranged in the reverse inclination to the vertical line, one above the other, as represented at $t^2$ in Figs. 3, 4, and 7, whereby a stud-pin, w', on the connecting-rod k' will touch one or the other of said arms, according to which way the engine runs when passing the centers, and just before the striking-bar j' touches the lever h', and will push back said arm, which will pull the spring-latch away from the lever, leaving it free to be shifted. As soon as the stud-pin w' passes the end of the spring-arm t', said arm springs back and allows the spring-latch to spring back against the side of the lever, so that the shoulder s' of the stop-latch snaps under the lever as soon as said lever passes the shoulder, and thus secures the lever again. The power may be transmitted from a pulley, x', on one of the shafts of the pulley e' or f', or of the sprocket-wheels, as preferred. It will be seen that in this improved arrangement of transmitting-gear the engine drives with the same leverage throughout the entire range of the strokes, which, it is believed, will enable the engine to develop more power and deliver it more steadily than with the crank, in which the leverage varies from nothing to the full length of the crank, and vice versa, at every stroke.

Having thus described my invention, what I claim as new, and desire to secure by Letters Patent, is—

1. The combination, with the piston-rod of a steam-engine or other reciprocating driver, of an endless belt or chain arranged in the line of the piston-rod, and means, substantially as described, for alternately connecting said rod with the upper and lower ranges of said belt or chain when the motion of the piston reverses, to drive the belt or chain continuously in the same direction, substantially as described.

2. The combination of clamps h i with the endless belt a and sliding block l, connected with the piston-rod c, said clamps being provided with means, substantially as described, for causing them to alternately grip and release the upper and lower ranges of the belt, respectively, as the motion of the piston-rod reverses, substantially as herein set forth.

3. The clamp-plates h and i, pivoted to the links n on opposite sides of the belt a, and said links n pivoted to the slide l, in combination with a stop device to hold the clamp slack on the back stroke, substantially as described.

4. The combination, with the slide l and clamp-plates i, of the stops p, connected to rock-arms provided with a crank, and said crank connected with a shifting-lever for reversing said stops to reverse the motion of the driving-belt, substantially as described.

5. The combination of the auxiliary belt $b'$ and pulley $c'$ with the driving-belt $a$ and pulleys $e\,f$, and a driving-slide, $l$, having means, substantially as described, for alternately engaging and driving the upper and lower ranges of the belt, substantially as set forth.

6. In an endless-chain mechanism, combined with the reciprocating slide $l$ of a steam piston-rod, a reversible driving-pawl, $g'$, and means for reversing it, arranged on the slide and in relation to the chain, substantially as described.

LARKIN B. ELLIS.

Witnesses:
F. S. PERKINS,
F. E. BURT.